(12) United States Patent
Tobin et al.

(10) Patent No.: US 11,668,275 B2
(45) Date of Patent: Jun. 6, 2023

(54) METHODS FOR MANUFACTURING AN OUTER SKIN OF A ROTOR BLADE (71) Applicant: General Electric Company, Schenectady, NY (US)

(72) Inventors: James Robert Tobin, Simpsonville, SC (US); Thomas Merzhaeuser, Munich (DE); Peggy Lynn Baehmann, Glenville, NY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 15/818,980

(22) Filed: Nov. 21, 2017

(65) Prior Publication Data

US 2019/0153995 A1 May 23, 2019

(51) Int. Cl.
*F03D 1/06* (2006.01)
*B29C 64/10* (2017.01)
(Continued)

(52) U.S. Cl.
CPC ............ *F03D 1/0675* (2013.01); *B29C 64/10* (2017.08); *B29C 70/0035* (2021.05); *B29C 70/302* (2021.05); *B29D 99/0028* (2013.01); *B29K 2105/06* (2013.01); *B33Y 10/00* (2014.12); *B33Y 80/00* (2014.12); *F03D 17/00* (2016.05); *F05B 2230/23* (2013.01); *F05B 2230/30* (2013.01);
(Continued)

(58) Field of Classification Search
CPC ....... F03D 1/0675; B29C 70/30; B29C 64/10; B29L 2031/085
See application file for complete search history.

(56) References Cited

U.S. PATENT DOCUMENTS

RE19,412 E 1/1935 Zaparka
2,450,440 A 10/1948 Mills
(Continued)

FOREIGN PATENT DOCUMENTS

CN 101906251 A 12/2010
CN 103358564 A 10/2013
(Continued)

OTHER PUBLICATIONS

Patlolla, New progress in self-healing technology of composite wind turbine blades, Department of Mechanical Engineering, Wichita State Univeristy, https://soar.wichita.edu/handle/10057/5493, Feb. 16, 2012, (Abstract Only).
(Continued)

*Primary Examiner* — Richard A Edgar
*Assistant Examiner* — Michael K. Reitz
(74) *Attorney, Agent, or Firm* — Dority & Manning, P.A.

(57) ABSTRACT

A method for manufacturing an outer skin of a rotor blade includes forming an outer skin layer of the outer skin from a first combination of at least one of one or more resins or fiber materials. The method also includes forming an inner skin layer of the outer skin from a second combination of at least one of one or more resins or fiber materials. More specifically, the first and second combinations are different. Further, the method includes arranging the outer and inner skin layers together in a stacked configuration. In addition, the method includes joining the outer and inner skin layers together to form the outer skin.

12 Claims, 9 Drawing Sheets

(51) Int. Cl.

| | |
|---|---|
| *B29C 70/00* | (2006.01) |
| *B29K 105/06* | (2006.01) |
| *B33Y 10/00* | (2015.01) |
| *B33Y 80/00* | (2015.01) |
| *B29D 99/00* | (2010.01) |
| *B29C 70/30* | (2006.01) |
| *F03D 17/00* | (2016.01) |

(52) U.S. Cl.
CPC ... *F05B 2280/10* (2013.01); *F05B 2280/2001* (2013.01); *F05B 2280/4002* (2013.01); *F05B 2280/6012* (2013.01); *F05B 2280/6013* (2013.01)

(56) References Cited

U.S. PATENT DOCUMENTS

| | | | |
|---|---|---|---|
| 2,451,131 A | 10/1948 | Vidal | |
| 2,503,450 A | 4/1950 | Nebesar | |
| 3,000,446 A | 9/1961 | Warnken | |
| 3,093,219 A | 6/1963 | Ramme | |
| 3,137,887 A | 6/1964 | Mannino et al. | |
| 3,321,019 A | 5/1967 | Dmitroff et al. | |
| 3,528,753 A | 9/1970 | Dutton et al. | |
| 3,586,460 A | 6/1971 | Toner | |
| 3,956,564 A | 5/1976 | Hillig | |
| 4,319,872 A | 3/1982 | Lupke | |
| 4,329,119 A | 5/1982 | Baskin | |
| 4,474,536 A | 10/1984 | Gougeon et al. | |
| 4,626,172 A | 12/1986 | Mouille et al. | |
| 4,718,844 A | 1/1988 | Dickhut | |
| 5,059,109 A | 10/1991 | Dickhut | |
| 5,088,665 A | 2/1992 | Vijgen et al. | |
| 5,346,367 A | 9/1994 | Doolin et al. | |
| 5,869,814 A | 2/1999 | Scoles | |
| 5,936,861 A * | 8/1999 | Jang | G05B 19/4099 |
| | | | 700/98 |
| 6,264,877 B1 | 7/2001 | Pallu De La Barriere | |
| 6,890,152 B1 | 5/2005 | Thisted | |
| 7,059,833 B2 | 6/2006 | Stiesdal et al. | |
| 7,364,407 B2 * | 4/2008 | Grabau | F03D 1/065 |
| | | | 416/229 R |
| 7,458,777 B2 | 12/2008 | Herr | |
| 7,637,721 B2 | 12/2009 | Driver et al. | |
| 7,976,275 B2 | 7/2011 | Miebach et al. | |
| 7,988,421 B2 | 8/2011 | Bakhuis et al. | |
| 8,007,624 B2 | 8/2011 | Stiesdal | |
| 8,062,728 B2 | 11/2011 | De Baets | |
| 8,083,488 B2 | 12/2011 | Fritz | |
| 8,092,187 B2 | 1/2012 | Bell | |
| 8,162,590 B2 | 4/2012 | Haag | |
| 8,273,806 B2 | 9/2012 | Guadagno et al. | |
| 8,317,479 B2 | 11/2012 | Vronsky et al. | |
| 8,376,450 B1 | 2/2013 | Long et al. | |
| 8,540,491 B2 * | 9/2013 | Gruhn | B29B 11/16 |
| | | | 416/230 |
| 8,602,761 B2 | 12/2013 | Arrizabalaga | |
| 8,657,581 B2 | 2/2014 | Pilpel et al. | |
| 8,673,106 B1 | 3/2014 | Jolley et al. | |
| 8,678,746 B2 | 3/2014 | Haag | |
| 8,708,691 B2 | 4/2014 | Matsen et al. | |
| 8,747,098 B1 | 6/2014 | Johnson et al. | |
| 8,865,798 B2 | 10/2014 | Merle et al. | |
| 8,877,116 B2 | 11/2014 | Grabau | |
| 8,932,024 B2 | 1/2015 | Hayashi et al. | |
| 8,961,142 B2 | 2/2015 | Wansink | |
| 8,992,813 B2 | 3/2015 | Robbins et al. | |
| 9,090,027 B2 | 7/2015 | Sutton | |
| 9,149,988 B2 * | 10/2015 | Mark | B29C 64/393 |
| 9,150,721 B2 | 10/2015 | Bateman et al. | |
| 9,377,005 B2 | 6/2016 | Yarbrough et al. | |
| 9,434,142 B2 * | 9/2016 | Levit | B32B 38/00 |
| 9,458,821 B2 | 10/2016 | Jacobsen et al. | |
| 9,512,818 B2 | 12/2016 | Richtman | |
| 9,719,489 B2 | 8/2017 | Stewart | |
| 10,273,935 B2 | 4/2019 | Albert | |
| 2003/0116262 A1 * | 6/2003 | Stiesdal | F03D 1/0675 |
| | | | 156/245 |
| 2004/0041304 A1 | 3/2004 | Willden et al. | |
| 2007/0065290 A1 | 3/2007 | Herr | |
| 2007/0077150 A1 | 4/2007 | Llorente Gonzalez | |
| 2007/0107189 A1 | 5/2007 | Prichard | |
| 2009/0068017 A1 | 3/2009 | Rudling | |
| 2009/0074585 A1 | 3/2009 | Koegler et al. | |
| 2009/0140527 A1 | 6/2009 | Pawar | |
| 2009/0148300 A1 | 6/2009 | Driver et al. | |
| 2009/0155084 A1 | 6/2009 | Livingston et al. | |
| 2009/0301648 A1 | 12/2009 | Hogg | |
| 2010/0047070 A1 | 2/2010 | Slot | |
| 2010/0121475 A1 | 5/2010 | Lyons | |
| 2010/0135806 A1 | 6/2010 | Benito | |
| 2010/0135815 A1 | 6/2010 | Bagepalli | |
| 2010/0296940 A1 | 11/2010 | Zuteck | |
| 2010/0296941 A1 | 11/2010 | Zuteck | |
| 2011/0018282 A1 | 1/2011 | Hayashi et al. | |
| 2011/0076149 A1 | 3/2011 | Santiago et al. | |
| 2011/0097211 A1 | 4/2011 | Rudling | |
| 2011/0097326 A1 | 4/2011 | Luehrsen | |
| 2011/0100540 A1 | 5/2011 | Matthew | |
| 2011/0103965 A1 * | 5/2011 | Mathew | F03D 1/0675 |
| | | | 416/233 |
| 2011/0135467 A1 | 6/2011 | Saddoughi et al. | |
| 2011/0142635 A1 | 6/2011 | Frizt | |
| 2011/0142667 A1 | 6/2011 | Miebach et al. | |
| 2011/0142668 A1 | 6/2011 | Rao | |
| 2011/0142670 A1 | 6/2011 | Pilpel | |
| 2011/0176928 A1 | 7/2011 | Jense | |
| 2011/0187115 A1 * | 8/2011 | Piasecki | F03D 13/20 |
| | | | 290/55 |
| 2011/0200444 A1 | 8/2011 | Garcia | |
| 2011/0223028 A1 | 9/2011 | Stege et al. | |
| 2011/0243736 A1 | 10/2011 | Bell | |
| 2011/0243750 A1 | 10/2011 | Gruhn | |
| 2011/0266721 A1 | 11/2011 | Song et al. | |
| 2011/0268558 A1 | 11/2011 | Driver | |
| 2011/0286853 A1 | 11/2011 | Kristensen | |
| 2012/0009069 A1 | 1/2012 | Grove-Nielsen | |
| 2012/0027590 A1 | 2/2012 | Bonnet | |
| 2012/0027610 A1 | 2/2012 | Yarbrough | |
| 2012/0027612 A1 | 2/2012 | Yarbrough | |
| 2012/0027613 A1 | 2/2012 | Yarbrough | |
| 2012/0067515 A1 * | 3/2012 | Dahl | B29D 99/0028 |
| | | | 156/245 |
| 2012/0121430 A1 | 5/2012 | Olsen et al. | |
| 2012/0128810 A1 | 5/2012 | Arriola Arrizabalaga et al. | |
| 2012/0134848 A1 | 5/2012 | Ramirez Jimenez et al. | |
| 2012/0138218 A1 | 6/2012 | Dean et al. | |
| 2012/0183408 A1 | 7/2012 | Noerlem | |
| 2012/0186730 A1 | 7/2012 | Sindo | |
| 2012/0263913 A1 | 10/2012 | Karem | |
| 2013/0108455 A1 | 5/2013 | Quiring et al. | |
| 2013/0164133 A1 * | 6/2013 | Grove-Nielsen | F03D 11/0025 |
| | | | 416/95 |
| 2013/0186558 A1 | 7/2013 | Comb | |
| 2013/0241117 A1 | 9/2013 | Lind | |
| 2014/0072715 A1 | 3/2014 | Jones et al. | |
| 2014/0119937 A1 * | 5/2014 | Fang | B29D 99/0028 |
| | | | 416/233 |
| 2014/0178204 A1 | 6/2014 | Livingston et al. | |
| 2014/0186175 A1 | 7/2014 | Baehmann et al. | |
| 2014/0205454 A1 | 7/2014 | Giovannetti et al. | |
| 2014/0295187 A1 * | 10/2014 | Jacobsen | B32B 27/08 |
| | | | 428/413 |
| 2014/0322023 A1 | 10/2014 | Tapia | |
| 2014/0328692 A1 | 11/2014 | Riddell et al. | |
| 2014/0334930 A1 | 11/2014 | Rob | |
| 2015/0023799 A1 * | 1/2015 | Wetzel | F03D 1/0675 |
| | | | 416/229 R |
| 2015/0224759 A1 | 8/2015 | Boon | |
| 2015/0247487 A1 | 9/2015 | Oerlemans et al. | |
| 2015/0308404 A1 | 10/2015 | Dahl | |
| 2015/0316028 A1 | 11/2015 | Breckenfeld | |
| 2015/0322920 A1 | 11/2015 | Jones | |

(56) References Cited

U.S. PATENT DOCUMENTS

| | | | |
|---|---|---|---|
| 2016/0023433 A1 | 1/2016 | Langone | |
| 2016/0107397 A1 | 4/2016 | Schibsbye | |
| 2016/0146019 A1 | 5/2016 | Pizano et al. | |
| 2016/0168997 A1 | 6/2016 | Garm | |
| 2016/0263844 A1* | 9/2016 | Smith | B29C 70/525 |
| 2016/0297145 A1 | 10/2016 | Wu | |
| 2016/0319801 A1 | 11/2016 | Smith | |
| 2016/0327019 A1 | 11/2016 | Tobin et al. | |
| 2016/0327020 A1 | 11/2016 | Tobin et al. | |
| 2016/0327021 A1 | 11/2016 | Tobin et al. | |
| 2016/0354984 A1 | 12/2016 | Hedges | |
| 2016/0377050 A1 | 12/2016 | Caruso et al. | |
| 2016/0377051 A1 | 12/2016 | Caruso et al. | |
| 2016/0377052 A1 | 12/2016 | Caruso et al. | |
| 2017/0015066 A1 | 1/2017 | Herrmann | |
| 2017/0021575 A1 | 1/2017 | Hansen et al. | |
| 2017/0022821 A1 | 1/2017 | Ferber | |
| 2017/0030330 A1 | 2/2017 | Caruso | |
| 2017/0050372 A1 | 2/2017 | Nielsen et al. | |
| 2017/0051718 A1 | 2/2017 | Klitgaard | |
| 2017/0057158 A1 | 3/2017 | Caruso et al. | |
| 2017/0058862 A1 | 3/2017 | Caruso et al. | |
| 2017/0058865 A1 | 3/2017 | Caruso et al. | |
| 2017/0058866 A1 | 3/2017 | Caruso | |
| 2017/0074236 A1 | 3/2017 | Hynum et al. | |
| 2017/0074237 A1 | 3/2017 | Caruso et al. | |
| 2017/0074238 A1 | 3/2017 | Tobin et al. | |
| 2017/0074240 A1 | 3/2017 | Caruso et al. | |
| 2017/0082087 A1 | 3/2017 | Yarbrough | |
| 2017/0082088 A1 | 3/2017 | Yarbrough et al. | |
| 2017/0082089 A1 | 3/2017 | Yarbrough et al. | |
| 2017/0100902 A1 | 4/2017 | Asmatulu et al. | |
| 2017/0113265 A1 | 4/2017 | Slavens et al. | |
| 2017/0122287 A1 | 5/2017 | Dobbe et al. | |
| 2017/0145990 A1 | 5/2017 | Drack et al. | |
| 2017/0175534 A1 | 6/2017 | Ferber | |
| 2017/0204833 A1 | 7/2017 | Albert et al. | |
| 2017/0225362 A1 | 8/2017 | Anthony et al. | |
| 2017/0252966 A1 | 9/2017 | Susnjara | |
| 2017/0306766 A1 | 10/2017 | Munzer | |
| 2017/0320275 A1* | 11/2017 | De Waal Malefijt | B29C 33/40 |
| 2018/0321659 A1* | 11/2018 | Dasappa | B33Y 50/00 |
| 2019/0001589 A1* | 1/2019 | Salimi | B29C 70/38 |
| 2019/0001650 A1* | 1/2019 | Sohn | B32B 5/26 |

FOREIGN PATENT DOCUMENTS

| | | |
|---|---|---|
| CN | 204488065 U | 7/2015 |
| CN | 104955278 A | 9/2015 |
| EP | 0435466 A2 | 7/1991 |
| EP | 2 204 577 A2 | 7/2010 |
| EP | 2653717 A1 | 10/2013 |
| EP | 2927482 A1 | 10/2015 |
| EP | 3037655 A1 | 6/2016 |
| EP | 3 138 697 A1 | 8/2017 |
| ES | 237 1893 | 11/2012 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2016/030170 A1 | 3/2016 |
| WO | WO2017/092766 A1 | 6/2017 |

OTHER PUBLICATIONS

Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

Teuwen et al., Vacuum Infused Thermoplastic Composites for Wind Turbine Blades, 2008 Wind Turbine Blade Workshop—Sandia National Laboratories, June 3, 2008, 22 pages.

U.S. Appl. No. 15/424,055, filed Feb. 3, 2017.

U.S. Appl. No. 15/424,084, filed Feb. 3, 2017.

PCT Search Report, dated Jun. 26, 2019.

CGTech Vericut, Automated Fibre Placement—wind bland: Vericut Composite CNC simulation, Sep. 16, 2015, YouTube, retrieved from the Internet on Sep. 28, 2019, URL: https://youtu.be/xFNtTE82DiU (Year: 2015).

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et al., Additive Manufacturing: Making Imagination the Major Limitation, Journal of Metals, vol. 66, No. 5, Springer, NY, Mar. 11, 2014. pp. 808-816.

European Search Report for EP Application No. 18882096.3, dated Jul. 30, 2021.

* cited by examiner

METHODS FOR MANUFACTURING AN OUTER SKIN OF A ROTOR BLADE

FIELD

The present disclosure relates in general to wind turbine rotor blades, and more particularly to a method for manufacturing an outer skin of a wind turbine rotor blade.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking outer and inner layers of fiber fabrics in a shell mold. The layers are then typically infused together, e.g. with a thermoset resin.

Methods for manufacturing rotor blades may also include forming the blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

For conventional rotor blades, the outer skin that forms the blade shell is typically constructed of fiber fabrics joined together via a single resin material. However, in certain instances, it may be beneficial to tailor the materials used to form the outer skin for various applications.

As such, the present disclosure is directed to methods for manufacturing an outer skin of a wind turbine rotor blade with different matrix resins and/or polymer additive layers.

BRIEF DESCRIPTION

Aspects and advantages of the invention will be set forth in part in the following description, or may be obvious from the description, or may be learned through practice of the invention.

In one aspect, the present disclosure is directed to a method for manufacturing an outer skin of a rotor blade. The method includes forming an outer skin layer of the outer skin from a first combination of one or more resins and/or fiber materials. The outer skin layer corresponds to an outer surface of the rotor blade. The method also includes forming an inner skin layer of the outer skin from a second combination of one or more resins and/or fiber materials. The inner skin layer corresponds to an inner surface of the rotor blade. More specifically, the first and second combinations of materials are different. Further, the method includes arranging the outer and inner skin layers together in a stacked configuration. In addition, the method includes joining the outer and inner skin layers together to form the outer skin of the rotor blade.

In one embodiment, the method may further include tailoring the first combination based on pigment augmentation, ultraviolet (UV) protection, heat protection, erosion protection, and/or ice formation prevention. As such, the resin of the first and/or second combinations may include a thermoplastic material (such as an amorphous thermoplastic material) and/or an optional fiber material such as glass fibers, carbon fibers, polymer fibers, wood fibers, bamboo fibers, ceramic fibers, nanofibers, or metal fibers.

In another embodiment, the method may include tailoring the second combination based on compatibility, bonding efficiency, welding efficiency, and/or structural performance (e.g. stiffness). Thus, the resin(s) of the second combination may include a thermoplastic material or a thermoset material. Further, the fiber materials of the second combination may include glass fibers, carbon fibers, polymer fibers, wood fibers, bamboo fibers, ceramic fibers, nanofibers, or metal fibers.

In particular embodiments, the method may include forming one of the outer or inner skin layers of a thermoplastic material and forming the other of the outer or inner skin layers of a thermoset material. In such embodiments, the skin layer formed of the thermoplastic material may have a thickness capable of flexing to allow vacuum conforming of the skin layer to a mold during joining.

In further embodiments, the method may include biasing an amount of thermoplastic material in one or both of the outer and inner skin layers so as to create resin-rich areas and resin-starved areas.

In additional embodiments, the method may include placing at least one structural layer between the outer and inner skin layers. For example, in such embodiments, the structural layer(s) may include pultrusions, one or more metal layers, one or more glass layers, wood, foam, structural foam, and/or fiber materials.

In several embodiments, the method may also include joining the first and second outer skin layers together via at least one of belt pressing, infusion, vacuum forming, or thermoforming.

In another embodiment, the method may include incorporating one or more secondary components into the outer skin layer and/or the inner skin layer before joining the outer and inner skin layers together. In such embodiments, the secondary component(s) may include one or more sensors, sensor wires, conductive elements or materials, self-healing elements, heating elements, electromagnetic shielding, one or more channels, welding strips, and/or welding meshes.

In still further embodiments, the step of incorporating the one or more secondary components into at least one of the outer skin layer, the inner skin layer, or the at least one structural layer may include 3-D printing the one or more secondary components, manually placing the one or more secondary components, automatically placing the one or more secondary components via a robotic system, or infusing the one or more secondary components. In further embodiments, the method may include aligning the secondary component(s) via a light projection system (e.g. such as a laser system). In yet another embodiment, the method may include printing and/or depositing at least one structural component onto the joined outer and/or inner skin layers.

In another aspect, the present disclosure is directed to a rotor blade panel for a rotor blade of a wind turbine. The rotor blade panel includes an outer skin layer formed from a first combination of one or more resins and/or fiber materials, the outer skin layer forming an outer surface of the rotor blade panel. The rotor blade panel also includes an inner skin layer arranged adjacent to the outer skin layer. The inner skin layer is formed from a second combination of one or more resins and/or fiber materials. Further, the first and second combinations of materials are different so as to achieve desired characteristics of the inner and outer surfaces of the panel. Moreover, the outer and inner skin layers form at least a portion of an airfoil shape of the rotor blade panel. The rotor blade panel may also include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing outer skins for wind turbine rotor blades using multiple material combinations. Use of different matrices and/or different fabrics within the laminate can be used to optimize bonding of printed structures while providing other desirable features on the outside surface. For example, the outer skin layer may include materials that provide UV protection, iceophobic protection, and/or erosion protection. Further, pultrusions and/or heavy glass may be added in between skin layers for improved strength, but that can also be vacuum-formed successfully in the intended process (even though the sheet is thicker and stiffer). In such configurations, the outer skin minimizes the amount of printed structure required. Sensors (such as fiber optics) and conductive elements or materials may also be incorporated into the laminate. Thus, the methods described herein provide many advantages not present in the prior art. For example, the methods of the present disclosure provide the ability to easily customize the blade outer skin to have various curvatures, aerodynamic characteristics, strengths, stiffness, etc.

Figure 1:
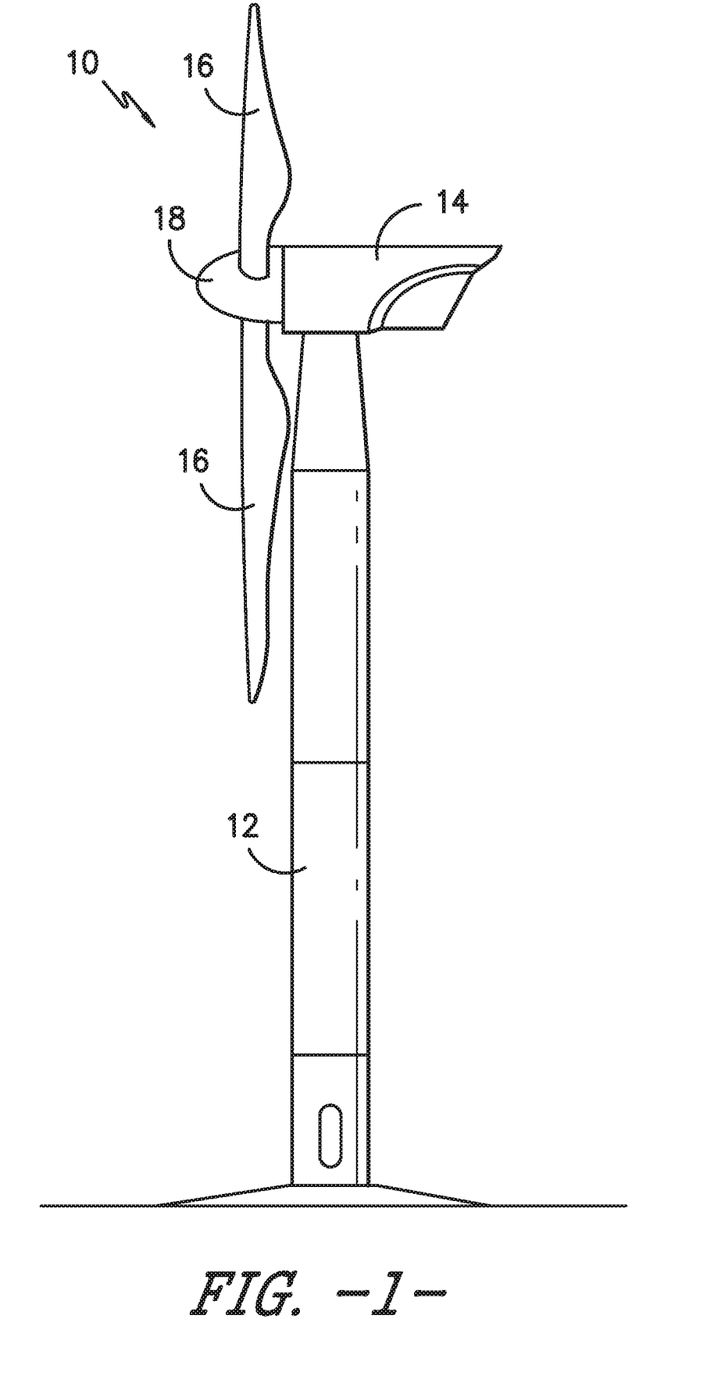
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
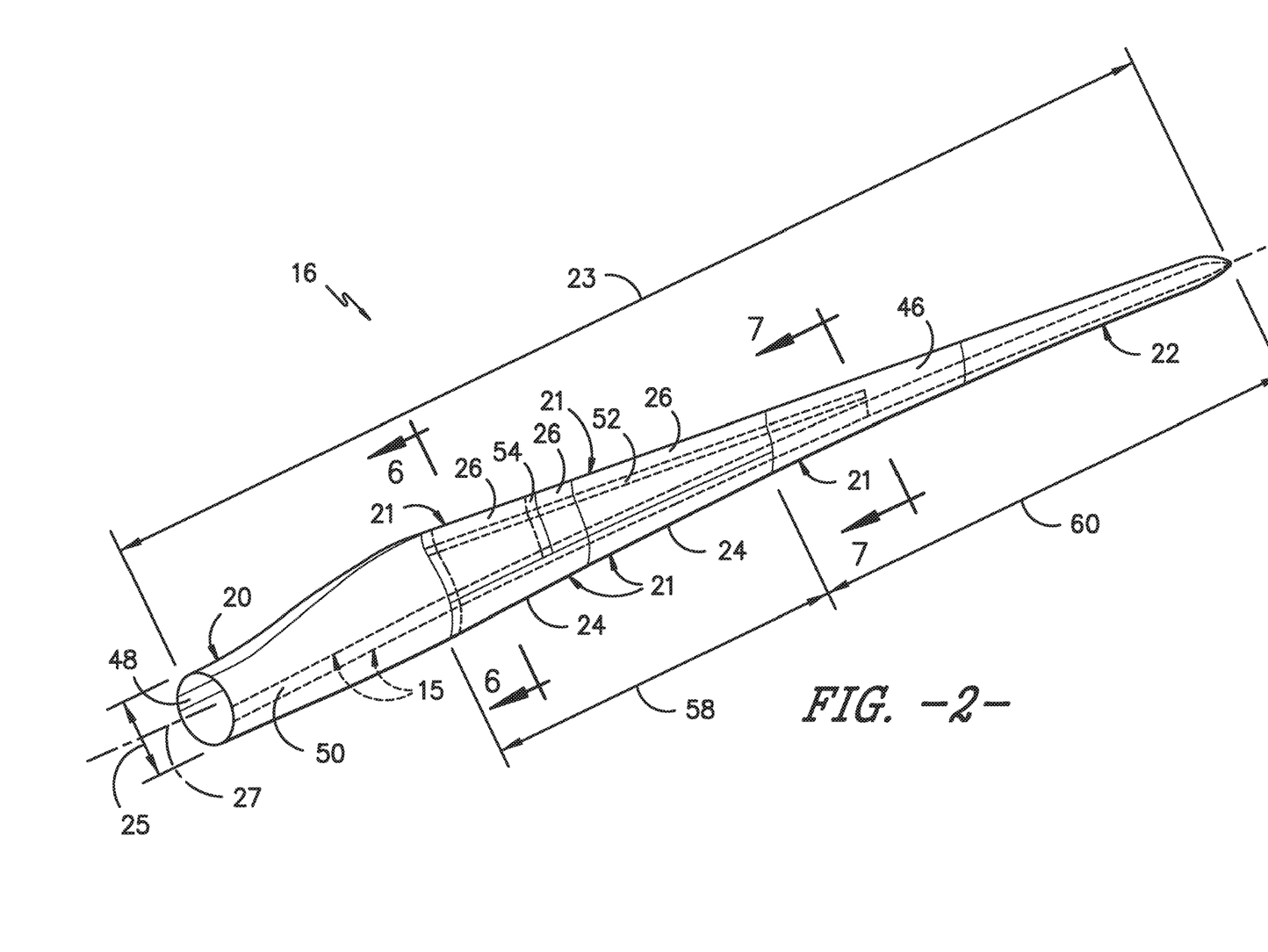
FIG. 2 illustrates a perspective view of one embodiment of a rotor blade of a wind turbine according to the present disclosure.
Figure 3:
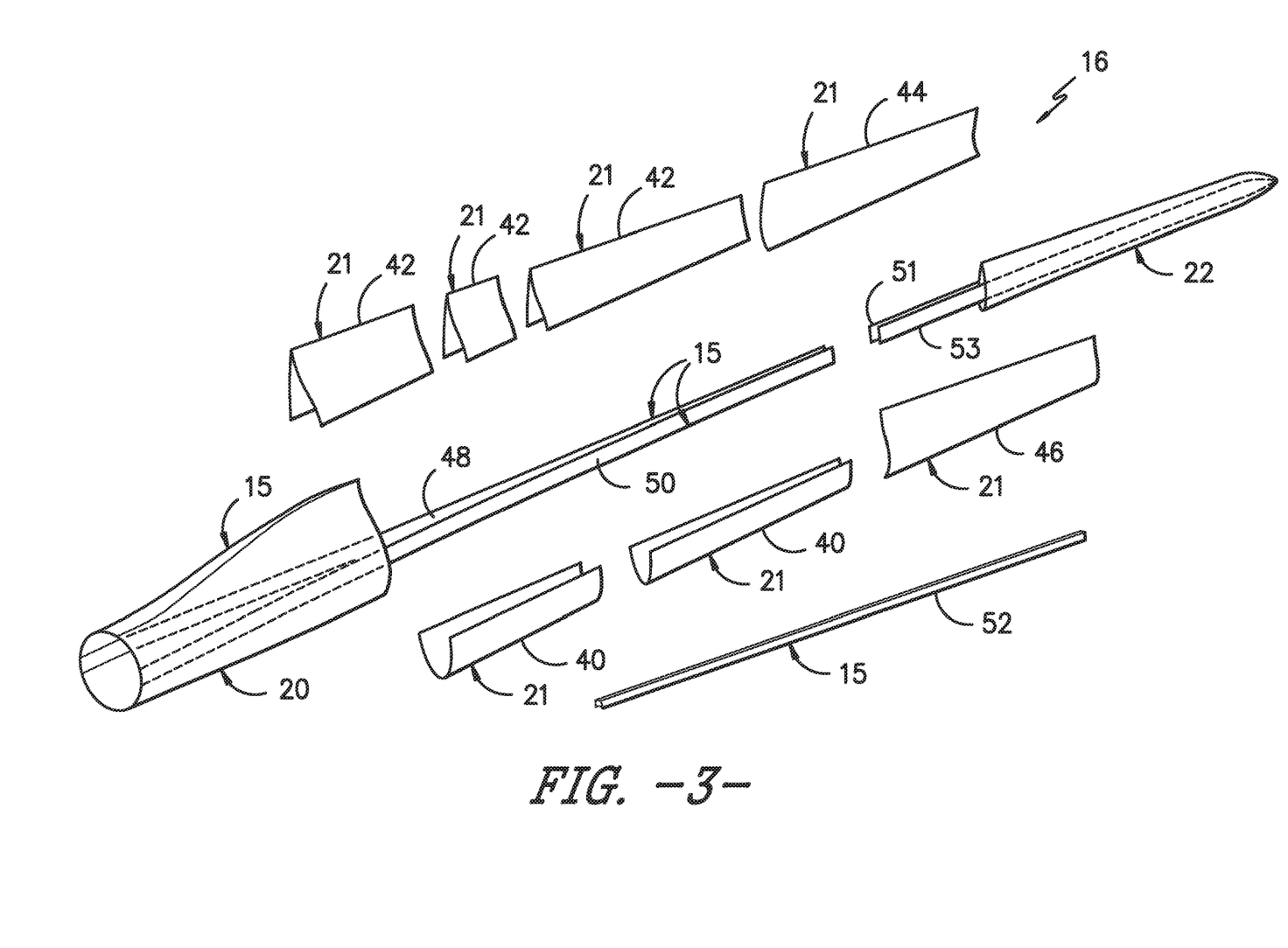
FIG. 3 illustrates an exploded view of the modular rotor blade of FIG. 2.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. For example, in one embodiment, a semi-crystalline thermoplastic resin that is modified to have a slow rate of crystallization may be used. In addition, blends of amorphous and semi-crystalline polymers may also be used.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

Figure 6:
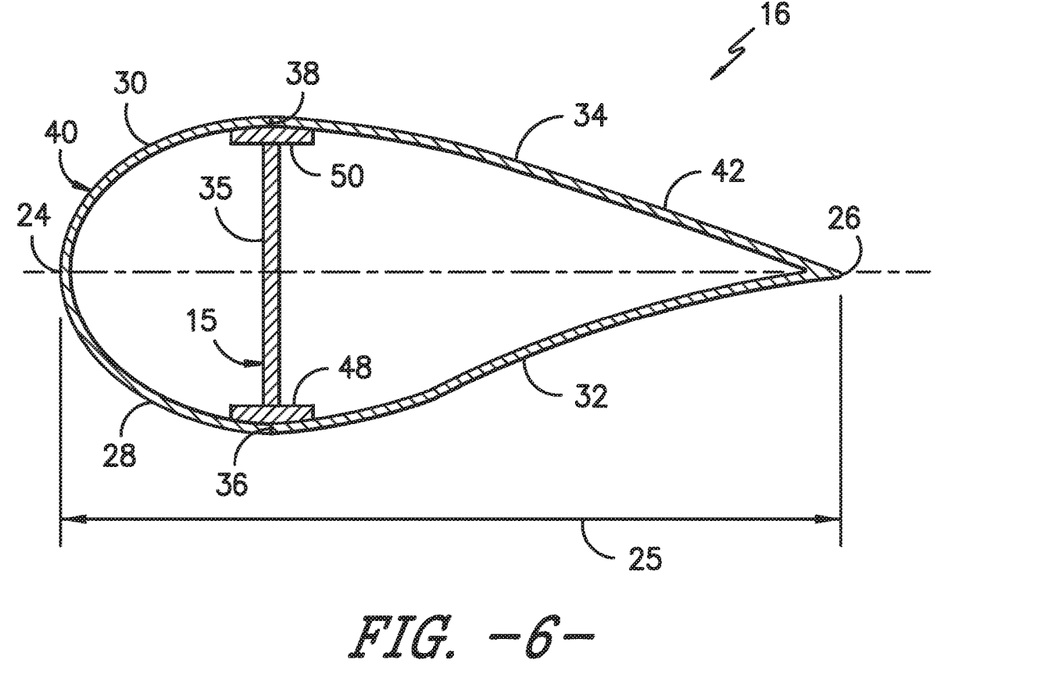
FIG. 6 illustrates a cross-sectional view of the modular rotor blade of FIG. 2 according to the present disclosure along line 6-6.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Figure 4:
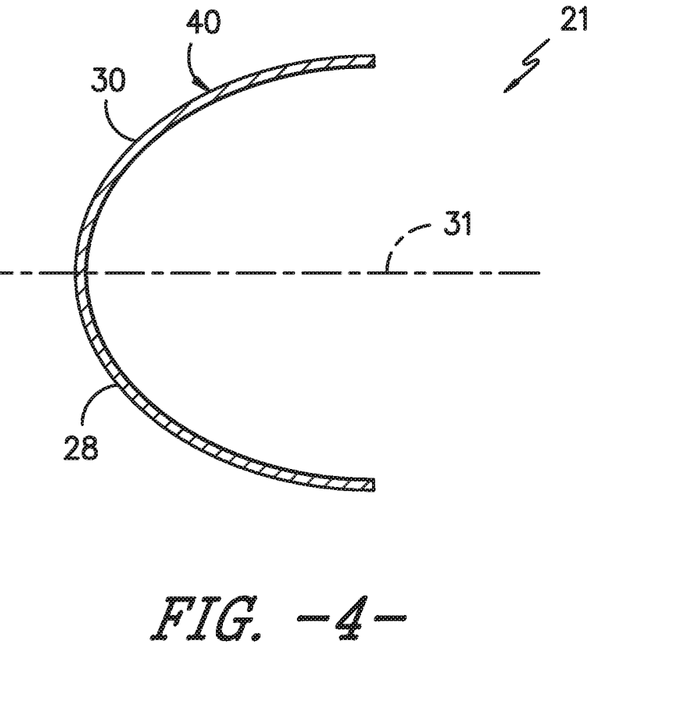
FIG. 4 illustrates a cross-sectional view of one embodiment of a leading edge segment of a modular rotor blade according to the present disclosure.

Referring particularly to FIGS. 2-4, any number of blade segments 21 or panels having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade panels 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

Figure 5:
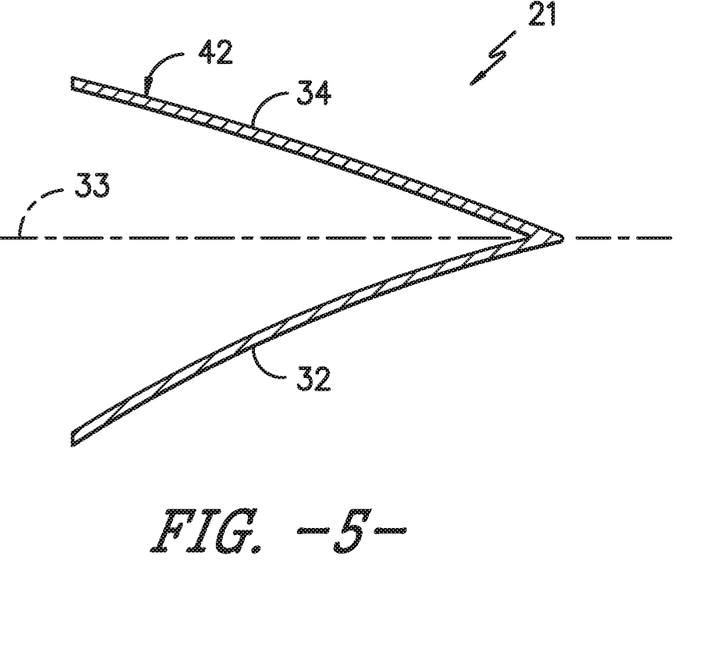
FIG. 5 illustrates a cross-sectional view of one embodiment of a trailing edge segment of a modular rotor blade according to the present disclosure.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Figure 7:
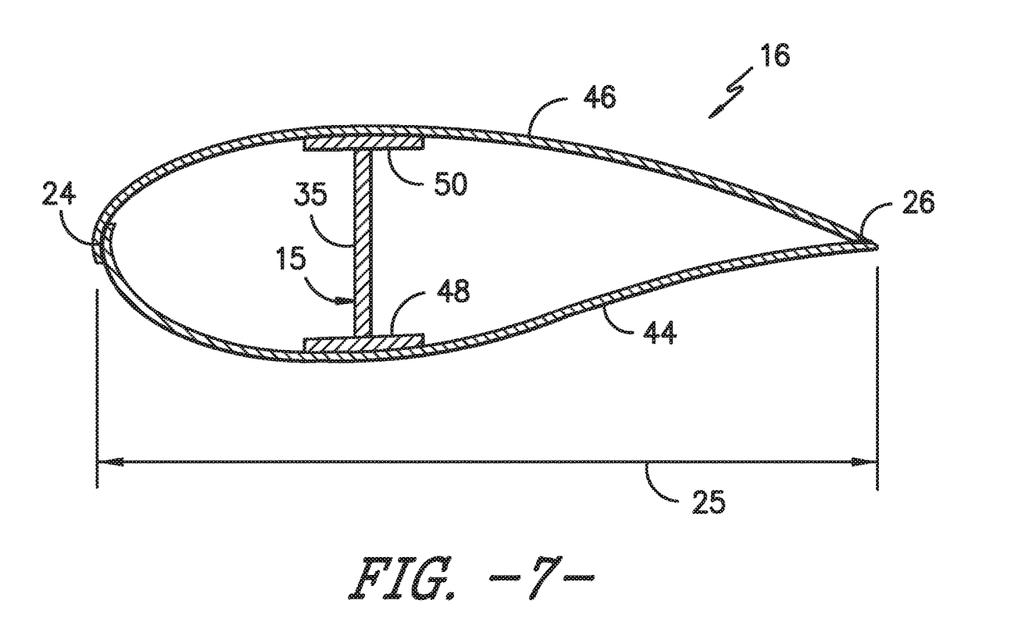
FIG. 7 illustrates a cross-sectional view of the modular rotor blade of FIG. 2 according to the present disclosure along line 7-7.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Figure 8:
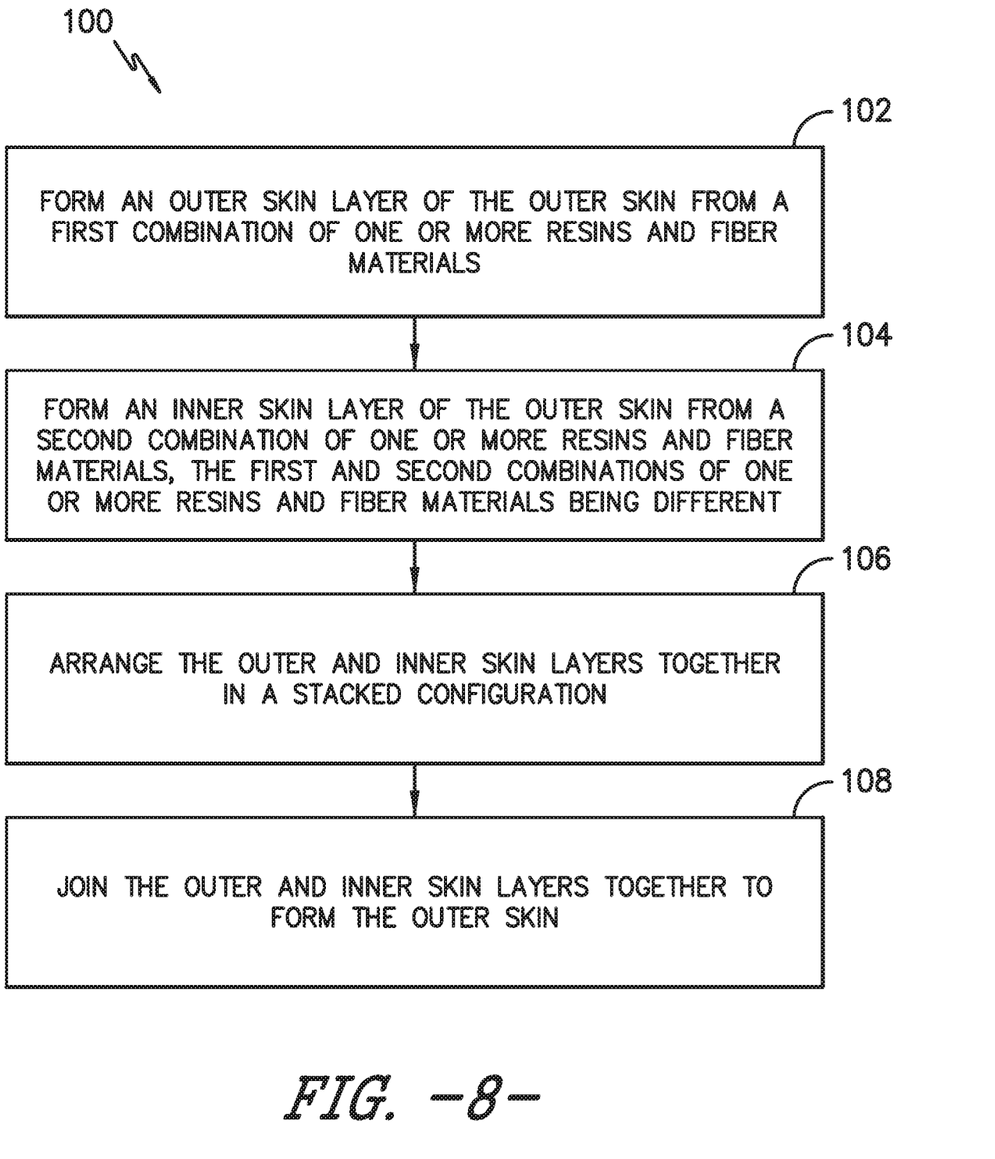
FIG. 8 illustrates a flow diagram of one embodiment of a method for manufacturing an outer skin of a rotor blade according to the present disclosure.

Referring now to FIG. 8, the present disclosure is directed to methods for manufacturing the outer skin 56 of the rotor blade 16 and/or the rotor blade panels 21 and rotor blade panels 21 manufactured via such methods. More specifically, the methods described herein encompass multiple material combinations within the inner and outer skin layers 60, 58 of the outer skin 56 of the rotor blade panel 21. Use of different matrices and/or different fabrics within the laminate can be used to optimize bonding of printed structures thereto while providing other desirable features on the outside surface of the panel 21.

For example, as shown at 102, the method 100 includes forming an outer skin layer 58 of the outer skin 56 from a first combination of one or more resins and/or fiber materials. More specifically, in one embodiment, the method 100 may include tailoring the first combination of resin(s) and/or fiber material(s) based on certain desired characteristics of the outer surface of the outer skins 56, such as pigment augmentation (i.e. to reduce and/or eliminate the need for painting), ultraviolet (UV) protection, heat protection, erosion protection or resistance, ice formation prevention, and/or other desirable properties. As such, the first combination of resin(s) and/or fiber material(s) may include a thermoplastic material, such as an amorphous thermoplastic material optionally reinforced with glass fibers, carbon fibers, polymer fibers, wood fibers, bamboo fibers, ceramic fibers, nanofibers, and/or metal fibers.

Similarly, as shown at 104, the method 100 also includes forming an inner skin layer 60 of the outer skin from a second combination of one or more resins and/or fiber materials. More specifically, the first and second combinations of materials may be different so as to accommodate certain desired characteristics of each surface 62, 64. Thus, in one embodiment, a thermoplastic fiberglass sheet could be made from one matrix on the exterior side and another on the interior. As such, in another embodiment, the method 100 may include tailoring the second combination of resin(s) and/or fiber material(s) based on compatibility, bonding efficiency to printed features, welding efficiency (e.g. welding multiple panels 21 together and/or welding components/features to the panels 21), and/or structural performance (e.g. stiffness). As used herein, "compatibility" generally refers to the compatibility between the corresponding skin layers as well as the compatibility to the printed grid structure. When using thermoplastics, the same thermoplastic may be used for each layer, however, there are also some different thermoplastics that can be thermally welded together.

The resin(s) of the second combination may include a thermoplastic material or a thermoset material. Further, such resins may be optionally reinforced with the fiber material(s) of the second combination. Including but not limited to glass fibers, carbon fibers, polymer fibers, wood fibers, bamboo fibers, ceramic fibers, nanofibers, or metal fibers. Thermoplastic materials are particularly useful for thermoplastic welding, whereas thermoset materials allow for more bonding options to other thermoset components.

Figure 9:
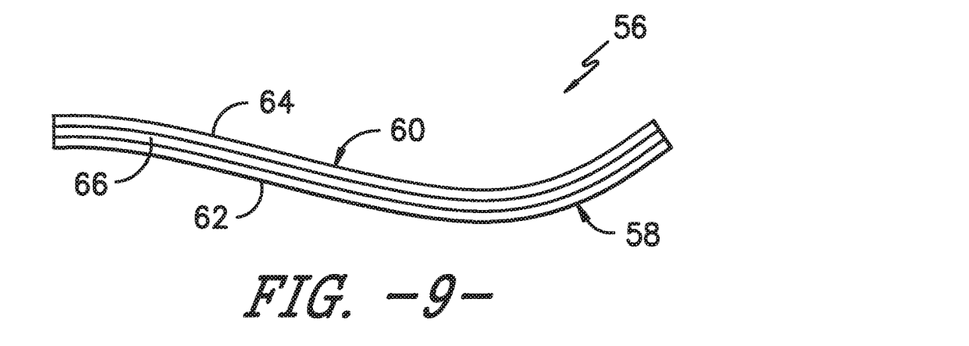
FIG. 9 illustrates a side view of one embodiment of an outer skin formed via the manufacturing methods according to the present disclosure.
Figure 10:
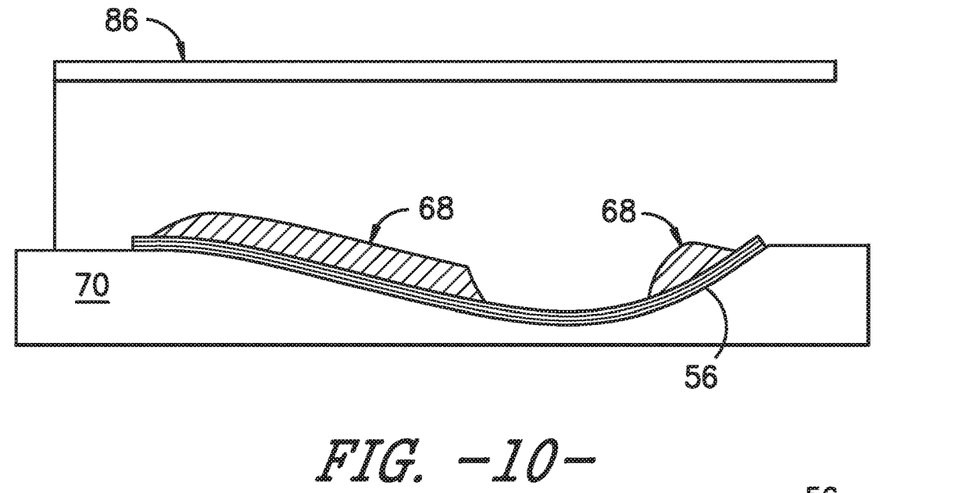
FIG. 10 illustrates a side view of one embodiment of outer and inner skin layers placed in a mold according to the present disclosure.

In addition, as shown in FIGS. 9 and 10, the outer and inner skin layers 58, 60 of the rotor blade panel 21 may be curved. In such embodiments, the method 100 may include forming the curvature of the outer and inner skin layers 58, 60. Such forming may include providing one or more generally flat fiber-reinforced skin layers, forcing the outer and inner skin layers 58, 60 into a desired shape corresponding to a desired contour, and maintaining the outer and inner skin layers 58, 60 in the desired shape during printing (e.g. of the grid structure 68). As such, the outer and inner skin layers 58, 60 generally retain their desired shape when the skin layers 58, 60 are released after printing.

Figure 11:
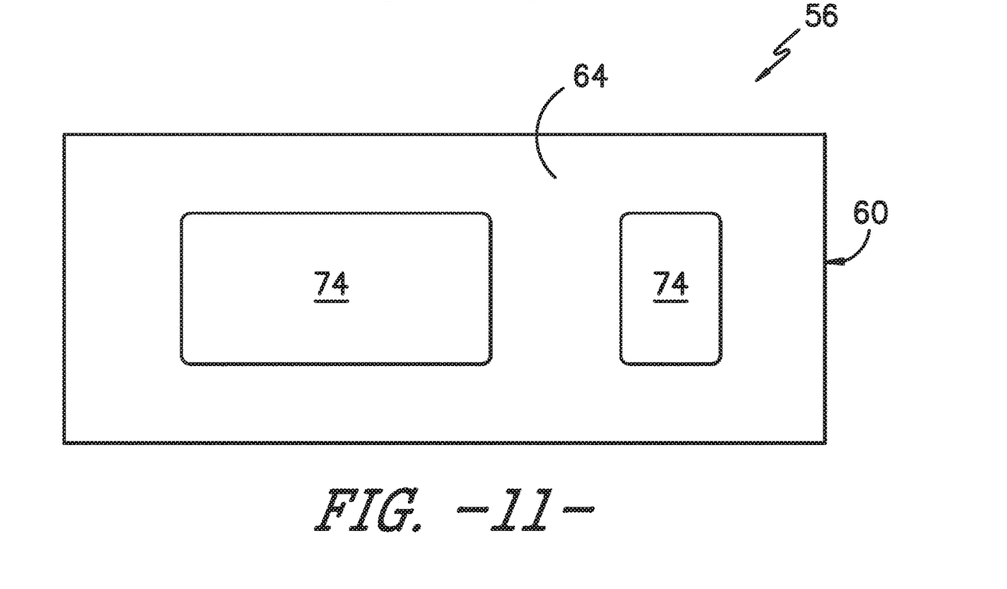
FIG. 11 illustrates a top view of one embodiment of an inner skin layer according to the present disclosure.

For example, in one embodiment, the method 100 may include biasing an amount of thermoplastic material in one or both of the outer and inner skin layers 58, 60 so as to create resin-rich areas and resin-starved areas. In such embodiments, the inner skin layer 60 may be formed with more (or even less) matrix resin material on the inside surface 64 to promote bonding with printed structural components (e.g. such as grid structures 68 illustrated in FIG. 10). As such, the method 100 described herein may include printing and/or depositing at least one structural component onto the joined outer and/or inner skin layers. The grid structures 68 described herein, as well as various other rotor blade components, may be formed using three-dimensional (3-D) printing or any suitable form of additive manufacturing. As such, the inner and outer skin layers 58, 60 can be manufactured to optimize the bonding of such structures directly thereto. Thus, resin-rich surfaces may promote thermal welding at desired interfaces (e.g. 3-D printed structures and/or sheet to sheet joints). In contrast, resin-starved areas promote improved integration of 3-D printed structures to fiber materials of the laminate. More specifically, FIG. 11 illustrates a top view of one embodiment of the inner skin layer 60, particularly illustrating the inner surface 64 having resin-rich areas 74 purposely placed in locations where the grid structures 68 are desired to be printed.

3-D printing, as used herein, is generally understood to encompass processes used to synthesize three-dimensional objects in which successive layers of material are formed under computer control (e.g. using a 3-D printer or computer numerical control (CNC) device having one or more extruders) to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

In particular embodiments, the method 100 may include forming one of the outer or inner skin layers 58, 60 of a thermoplastic material and forming the other of the outer or inner skin layers 58, 60 of a thermoset material. In additional embodiments, the method 100 may include varying the skin layer thickness and/or fiber content, as well as the fiber orientation. As such, in one embodiment, skin layers formed of the thermoplastic material may have a thickness capable of flexing to allow vacuum conforming of the skin layer to a mold during joining.

Referring back to FIG. 8, as shown at 106, the method 100 includes arranging the outer and inner skin layers 58, 60 together in a stacked configuration. For example, as shown in FIGS. 9 and 10, once the skin layers 58, 60 are formed, the method 100 may include placing the skin layers 58, 60 into a mold 70 of the rotor blade panel 21 atop one another.

In additional embodiments, as shown, the method 100 may also include placing at least one structural layer 66 between the outer and inner skin layers 58, 60. As such, the amount of 3-D printed structures needed to strengthen the rotor blade 16 and/or the individual panels 21 may be reduced as thicker skin layers can be formed. For example, in such embodiments, the structural layer(s) 66 may include pultrusions, one or more metal layers, one or more glass layers, and/or fiber materials. More specifically, in particular embodiments, pultrusions and/or heavy glass can be added in between the outer and inner skin layers 58, 60 to form an improved structure that can still be vacuum formed successfully in the intended process, even though the sheet is thicker and stiffer. In such embodiments, the structural layer(s) 66 are configured to minimize the amount of printed structure (e.g. grid structure 68) required. In additional embodiments, thicker skin layers can also be formed simply by adding more fabric layers.

Figure 12:
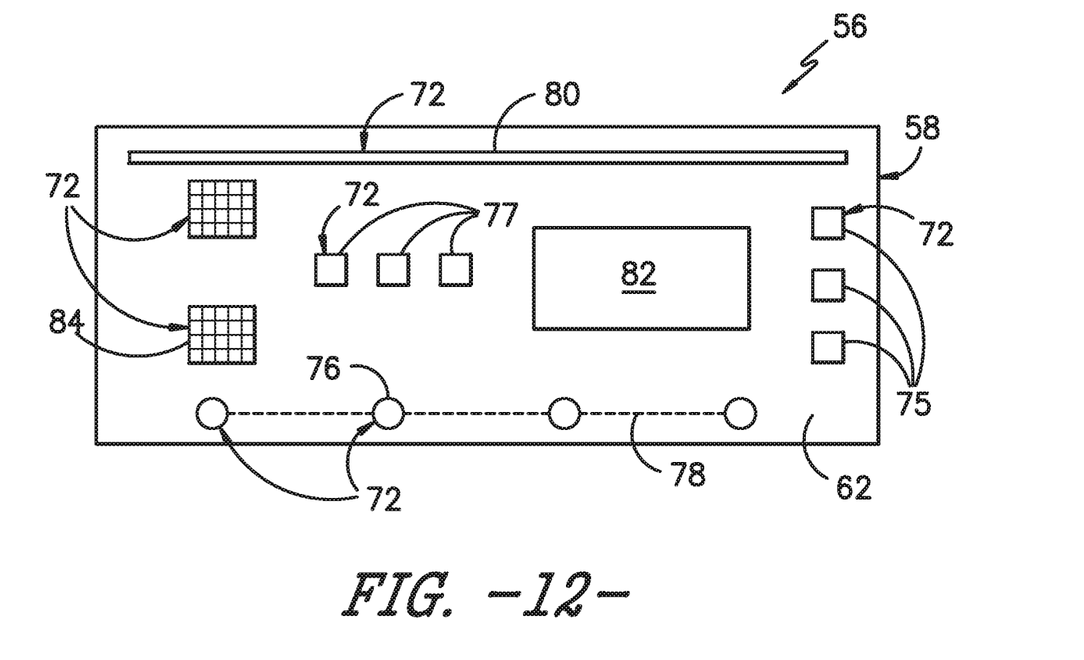
FIG. 12 illustrates a top view of one embodiment of an outer skin layer according to the present disclosure.

In another embodiment, the method 100 may include incorporating one or more secondary components 72 into the outer skin layer 58 and/or the inner skin layer 60 before joining the outer and inner skin layers 58, 60 together. For example, as shown in FIG. 12, a top view of one embodiment of the outer surface 62 of the outer skin layer 60 is illustrated, particularly illustrating various secondary components 72 formed directed into the outer skin 56 is illustrated. Such components 72 may be incorporated into the outer or inner skin layers 58, 60 using any suitable means, such as 3-D printing, manual placement, infusion with the outer skin 56, etc.

In such embodiments, as shown in FIG. 12, the secondary component(s) 72 may include a sensor system having one or more sensors 76 (e.g. such as fiber optic sensors, probes, acoustic sensors, etc.), sensor wires 78, electrically conductive materials 75 or elements (e.g. such as carbon, carbon fiber fillers, and/or any suitable lightning receptors), radiation absorptive materials, self-healing elements 77 (e.g. magnetically or electrically attractive resin pockets), heating elements 80, electromagnetic shielding 82, one or more channels, supports, or tubing, and/or one or more welding features 84 (e.g. welding strips or meshes for use with thermoplastic welding, resistance/inductive welding, chemical welding, and/or laser/infrared type welding).

In additional embodiments, one or more components of the sensor system may be incorporated into the grid structure(s) 68 and/or the outer skins 56 during the printing process. In such embodiments, the sensor system may be a surface pressure measurement system arranged with the grid structure 68 and/or directly incorporated into the outer or inner skin layers 58, 60. As such, the printed structure 68 and/the outer or inner skin layers 58, 60 may be manufactured to include the series of tubing/channels needed to easily install the sensor system. Further, the printed structure 68 and/or the outer or inner skin layers 58, 60 may also provide a series of holes therein for receiving connections of the system. Thus, the manufacturing process is simplified by printing various structures into the grid structure 68 and/or the skins 56 to house the sensors 76, act as the static pressure port, and/or act as the tubing that runs directly to the outer blade skin layer. Such systems may also enable the use of pressure taps for closed loop control of the wind turbine 10.

Figure 13:
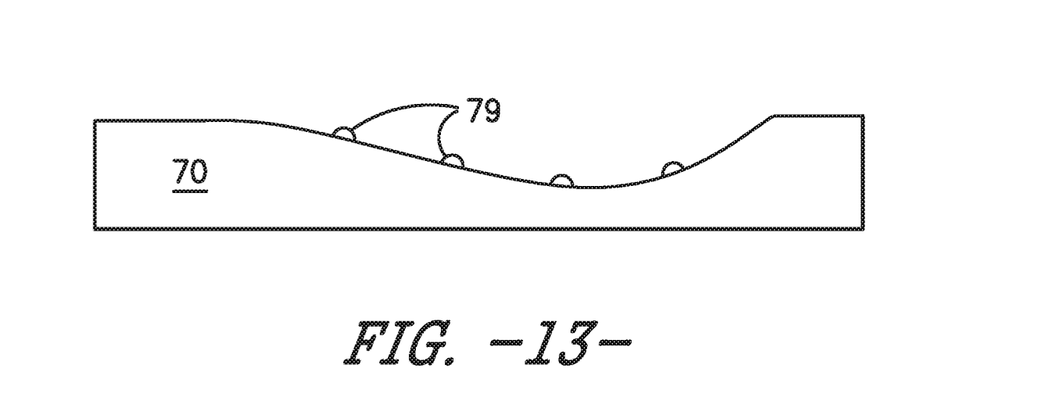
FIG. 13 illustrates a side view of one embodiment of a rotor blade panel mold according to the present disclosure.

In still further embodiments, as shown in FIG. 13, the mold 70 may include certain marks 79 (such as a positive mark) that are configured to create a small dimple in the skin during manufacturing. Such marks 79 allow for easy machining of the holes in the exact location needed for the associated sensors. In addition, additional sensor systems may be incorporated into the grid structures 68 and/or the outer or inner skin layers 58, 60 to provide aerodynamic or acoustic measurements so as to allow for either closed loop control or prototype measurements.

In addition, the heating elements 80 described herein may be flush surface mounted heating elements distributed around the blade leading edge. Such heating elements 80 allow for the determination of the angle of attack on the blade by correlating temperature/convective heat transfer with flow velocity and the stagnation point. Such information is useful for turbine control and can simplify the measurement process. It should be understood that such heating elements 80 may also be incorporated into the outer or inner skin layers 58, 60 in additional ways and are not required to be flush mounted therein.

Referring still to the secondary materials, the conductive materials described herein may be incorporated or otherwise deposited into or onto the outer or inner skin layers 58, 60 to provide one or more of the following benefits thereto: de-icing, lighting protection, self-healing, supply power for the sensors 76, or to act as a sensor itself. Generally, conductive materials in wind turbine rotor blades should be connected to the lightning protection system thereof as failure to do so invites lightning damage since strikes attach to the conductive material with no place to discharge energy. As such, the conductive materials described herein can be selectively deposited onto the outer skin 56 and used for electric resistance thermoplastic welding so as to form connections to the lightning protection system.

In such embodiments, the CNC device may selectively use a conductive resin to print a multitude of conductive traces from a welding strip or from its own area of printed conductive area at a weld joint along the outer skin 56 to a connection point for connection to the lightning protection system. The printed traces can also transition to a printed connection to allow use of a conductive rod to be assembled into a printed receptacle. The same printed conductive material may be used to continuously print the welding strip, the trace, the receptacle for a metal cable, metal strip, etc. The metal device may also be encapsulated into the receptacle by overprinting on top of the part. In addition, a conductive trace grid may be directly printed to the mold first, prior to vacuum forming the outer skin 58. In such embodiments, the conductive traces would remain on the outer surface of the outer skin layer 58. A tape laying head could also be used to place wire-based thermoplastic tape directly to the mold first, or to the inside surface of the inner skin layer 58 to also act as traces to the lightning protection system.

As mentioned, for welding processes other than thermoplastic welding, such as laser/infrared welding, a pigment, such as white TiO2, may be added to the skin layers 58, 60 to absorb the radiant energy. Moreover, non-conductive but absorptive materials may enable thermoplastic welding to the outer skins 56 without having to put conductive materials in rotor blades 16 not connected to a lightning protection system and incur lightning damage risk.

For inductive welding, the 3-D printer may trace an interconnected grid of conductive materials. Without interconnection, response to the alternating magnetic field will not generate heat. In contrast, resistance welding may not require an interconnected grid pattern. Further, in inductive welding, fiberglass typically does not generate a heating response from induction sources; therefore, thermal degradation of the bulk of the matrix or resin is minimized. Moreover, fiberglass concentrates heat at the weld joint where needed.

To incorporate the welding mesh(es) 84 described herein, one or more recesses may be formed in the mold surface and the welding mesh can be applied directly to the mold prior to forming the skin layers 58, 60. In addition, the welding mesh 84 can be applied to the flat fiberglass sheet prior to forming. Further, any suitable materials may be used to form the welding mesh 84. For example, for inductive welding, the welding mesh 84 may include carbon fiber thermoplastic strips and/or cross ply fibers for heating. For non-aerodynamic surfaces at welded joint seams, vacuum forming may be used to apply a recessed area and/or witness lines to accurately locate the welding mesh(es) 84.

The conductive elements, which may include conductive strips, may be wires intentionally porous to prevent blocking of the vacuum holes in the mold when forming the skin layers 58, 60, thereby allowing for temporary hold of the strips while also allowing vacuum pull of the primary thermoplastic fiberglass laminate down over top of the strips. In such embodiments, the extruder of the CNC device may be equipped with a spool of metal wire or narrow wire mesh. As such, the metal wire may be fed through melt in the extruder and incorporated into the printed road. Alternatively, the wire or mesh could be applied by a separate head and covered by the printed road.

In addition, as mentioned, the secondary materials or components may include one or more defined channels configured to receive a conductor that maintains intimate contact with the outer skin 56 to ground the rotor blade 16. In such embodiments, a central conductor with leads placed periodically along the length of the rotor blade 16 can be used to connect to any of the conductive elements of the lightning protection system.

For rotor blade repair, certain secondary materials may include a central conductive layer may also be included between the skin layers 58, 60 and/or a certain amount of carbon black pigment within the resin may be included to allow operators the ability to apply local heat as needed.

In certain instances, some of the secondary materials or components may require positional accuracy such that the component is placed in the correct location in the final blade assembly. Thus, as shown in FIG. 10, the method 100 may include aligning the secondary component(s) 72 via an alignment system 86. For example, as shown, the alignment system 86 may be configured overhead of the mold 70 so as to provide details to an operator regarding where to locate the secondary components 72 described herein. More specifically, in certain embodiments, the alignment system 86 may be an automated robotic system or a light projection system (e.g. a laser system with overhead laser illumination to show operators where to place the secondary component(s) 72. In addition, the method 100 includes ensuring that the embedded secondary components 72 will survive deformation and/or heating during the joining process.

Figure 14:
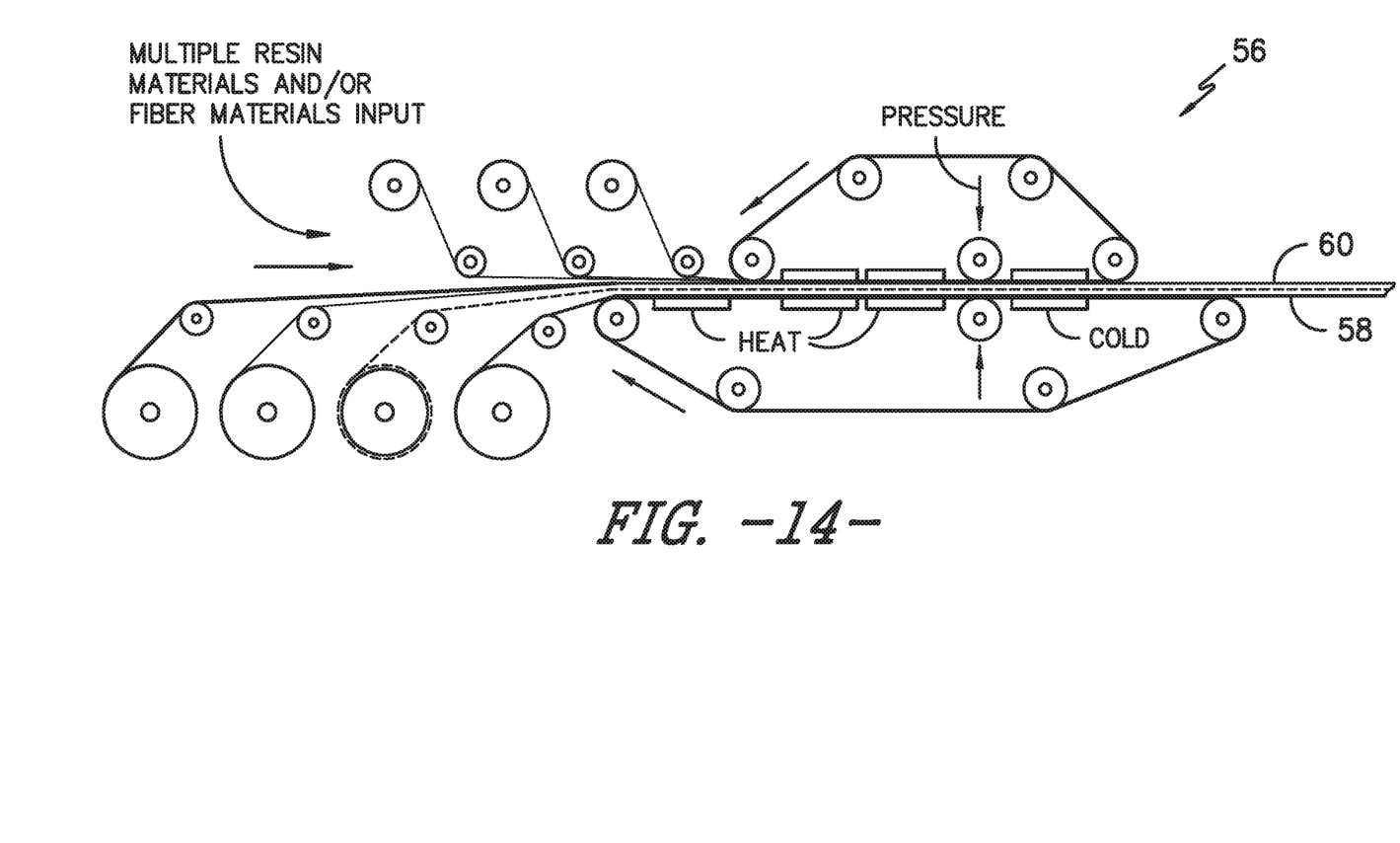
FIG. 14 illustrates a schematic diagram of one embodiment of double belt pressing processing for forming outer and inner skin layers according to the present disclosure.

Referring back to FIG. 8, as shown at 108, the method 100 includes joining the outer and inner skin layers 58, 60 together to form the outer skin 56. For example, in certain embodiments, the method 100 may include joining the first and second outer skin layers 58, 60 together via belt pressing, infusion, vacuum forming, pressure forming, thermoforming, or any other suitable joining process. More specifically, as shown in FIG. 10, the outer and inner skin layers 58, 60 may be placed into the mold 70 and joined together via vacuum infusion. Alternatively, as shown in FIG. 14, the outer and inner skin layers 58, 60 may be joined together a double belt press process to form the outer skin 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing an outer skin forming a panel of a rotor blade, the method comprising:
   a. forming the outer skin for forming the panel of the rotor blade, the forming comprising:
      i. forming an outer skin layer of the outer skin from a first combination of at least one of one or more resins or fiber materials comprising an amorphous thermoplastic resin material, the outer skin layer corresponding to an outer surface of the rotor blade;
      ii. forming an inner skin layer of the outer skin from a second combination of at least one or more resins or fiber materials comprising an amorphous thermoplastic resin material, the inner skin layer corresponding to an inner surface of the rotor blade, the first combination and the second combination being different, the inner skin layer comprising an inner surface that corresponds to a print-side surface;
      iii. biasing an amount of thermoplastic resin material in the inner skin layer to create resin-rich areas;
      iv. forming an intermediate, structural skin layer of the outer skin from at least one of the first combination, the second combination, or a third combination of at least one of one or more resins or fiber materials;
      v. arranging the outer, intermediate, and inner skin layers together in a stacked configuration; and
      vi. joining the outer, intermediate, and inner skin layers together to form the outer skin for forming the panel of the rotor blade, wherein the stacked outer, intermediate, and inner skin layers are flexed such that the outer skin for forming the panel comprises a contour defined, at least in part, by a curvature;
   wherein the formed outer skin forming the panel comprises the one or more resin-rich areas on the print-side surface, and wherein the print-side surface comprises a curved portion defined by the curvature; and
   b. printing and depositing, via an extruder of a three-dimensional (3-D) printer, a thermoplastic resin material in a plurality of adjacent layers onto the one or more resin-rich areas of the curved portion of the print-side surface of the formed outer skin forming the panel of the rotor blade to build up at least one grid structure onto the one or more resin-rich areas of the curved portion of the print-side surface of the formed outer skin forming the panel,
   wherein the at least one grid structure is printed and deposited only at the one or more resin-rich areas and not other areas of the print-side surface of the formed outer skin forming the panel of the rotor blade.

2. The method of claim 1, wherein the intermediate, structural skin layer comprises at least one of pultrusions, one or more metal layers, one or more glass layers, one or more carbon layers, wood, foam, structural foam.

3. The method of claim 1, further comprising joining the outer, intermediate, and inner skin layers together via at least one of belt pressing, one or more adhesives, or infusion.

4. The method of claim 1, further comprising incorporating one or more secondary components into at least one of the outer skin layer, the inner skin layer, or the intermediate, structural layer arranged therebetween, the one or more secondary components comprising at least one of one or more sensors, sensor wires, conductive elements or materials, self-healing elements, heating elements, electromagnetic shielding, tubing, one or more channels, welding strips, or welding meshes.

5. The method of claim 4, wherein incorporating the one or more secondary components into at least one of the outer skin layer, the inner skin layer, or the intermediate, structural layer further comprises at least one of 3-D printing the one or more secondary components, manually placing the one or more secondary components, automatically placing the one or more secondary components via a robotic system, or infusing the one or more secondary components.

6. The method of claim 5, further comprising aligning the one or more secondary components via a light projection system.

7. A method for manufacturing an outer skin forming a panel of a rotor blade, the method comprising:
   forming the outer skin for forming the panel of the rotor blade, the forming comprising:
      forming an outer skin layer of the outer skin from a first combination of at least one of one or more resins or fiber materials comprising an amorphous thermoplastic resin material, the outer skin layer corresponding to an outer surface of the rotor blade, the outer skin layer configured to flex to allow vacuum conforming to a mold;
      forming an inner skin layer of the outer skin from a second combination of at least one or more resins or fiber materials comprising an amorphous thermoplastic resin material, the inner skin layer corresponding to an inner surface of the rotor blade, the first combination and the second combination being different, the inner skin layer comprising an inner surface that corresponds to a print-side surface;
      biasing an amount of thermoplastic resin material in the inner skin layer to create resin-rich areas, the inner skin layer configured to flex to allow vacuum conforming to a mold;
      forming an intermediate, structural skin layer from at least one of the first combination, the second combination, or a third combination of at least one of one or more resins or fiber materials, the intermediate, structural skin layer configured to flex to allow vacuum conforming to a mold;
      arranging the outer, intermediate, and inner skin layers together in a stacked configuration; and
      joining the outer, intermediate, and inner skin layers together to form the outer skin for forming the panel of the rotor blade;
      wherein the layers of the stacked configuration vacuum conformed yield the panel comprising a contour defined, at least in part, by a curvature;
      wherein the formed outer skin forming the panel comprises the one or more resin-rich areas on the print-side surface, and wherein the print-side surface comprises a curved portion defined by the curvature; and
   printing and depositing, via an extruder of a three-dimensional (3-D) printer, a thermoplastic resin material in a plurality of adjacent layers onto the one or more resin-rich areas of the curved portion of the print-side surface of the formed outer skin forming the panel of the rotor blade to build up at least one grid structure onto the one or more resin-rich areas of the curved portion of the print-side surface of the formed outer skin forming the panel,
   wherein the at least one grid structure is printed and deposited only at the one or more resin-rich areas and not other areas of the print-side surface of the formed outer skin forming the panel of the rotor blade.

8. The method of claim 7, wherein the intermediate, structural skin layer comprises at least one of pultrusions, one or more metal layers, one or more glass layers, one or more carbon layers, wood, foam, structural foam.

9. The method of claim 7, further comprising joining the outer, intermediate, and inner skin layers together via at least one of belt pressing, one or more adhesives, or infusion.

10. The method of claim 7, further comprising incorporating one or more secondary components into at least one of the outer skin layer, the inner skin layer, or the intermediate, structural layer arranged therebetween, the one or more secondary components comprising at least one of one or more sensors, sensor wires, conductive elements or materials, self-healing elements, heating elements, electromagnetic shielding, tubing, one or more channels, welding strips, or welding meshes.

11. The method of claim 10, wherein incorporating the one or more secondary components into at least one of the outer skin layer, the inner skin layer, or the intermediate, structural layer further comprises at least one of 3-D printing the one or more secondary components, manually placing the one or more secondary components, automatically placing the one or more secondary components via a robotic system, or infusing the one or more secondary components.

12. The method of claim 11, further comprising aligning the one or more secondary components via a light projection system.

\* \* \* \* \*